Nov. 18, 1969  F. L. RIGBY  3,478,930
APPARATUS FOR DISPENSING VISCOUS MATERIALS SUCH AS HOP EXTRACT
Filed Dec. 5, 1967  3 Sheets-Sheet 1
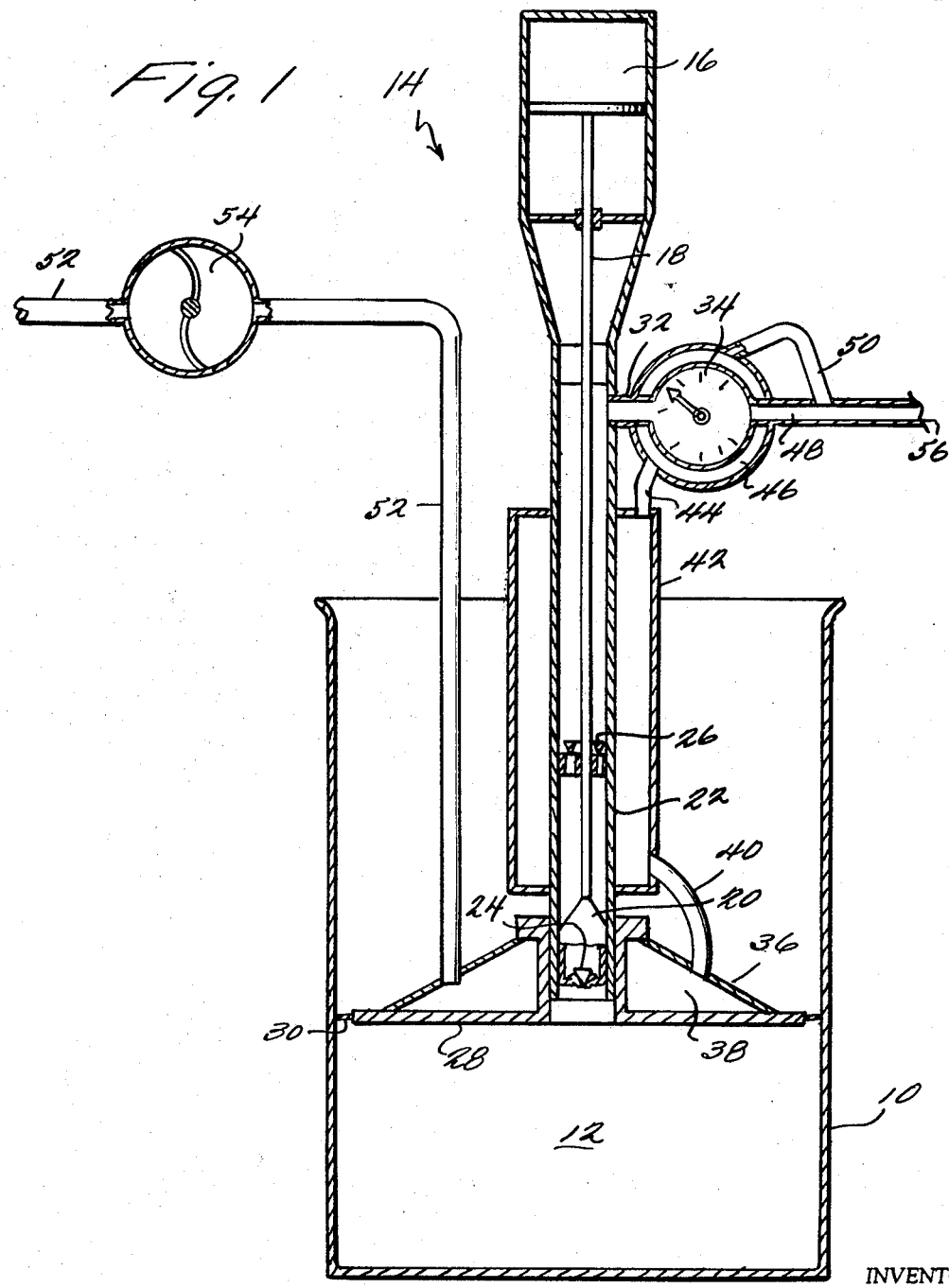
INVENTORS
FRANCIS L RIGBY
BY Cushman, Darby & Cushman
ATTORNEYS

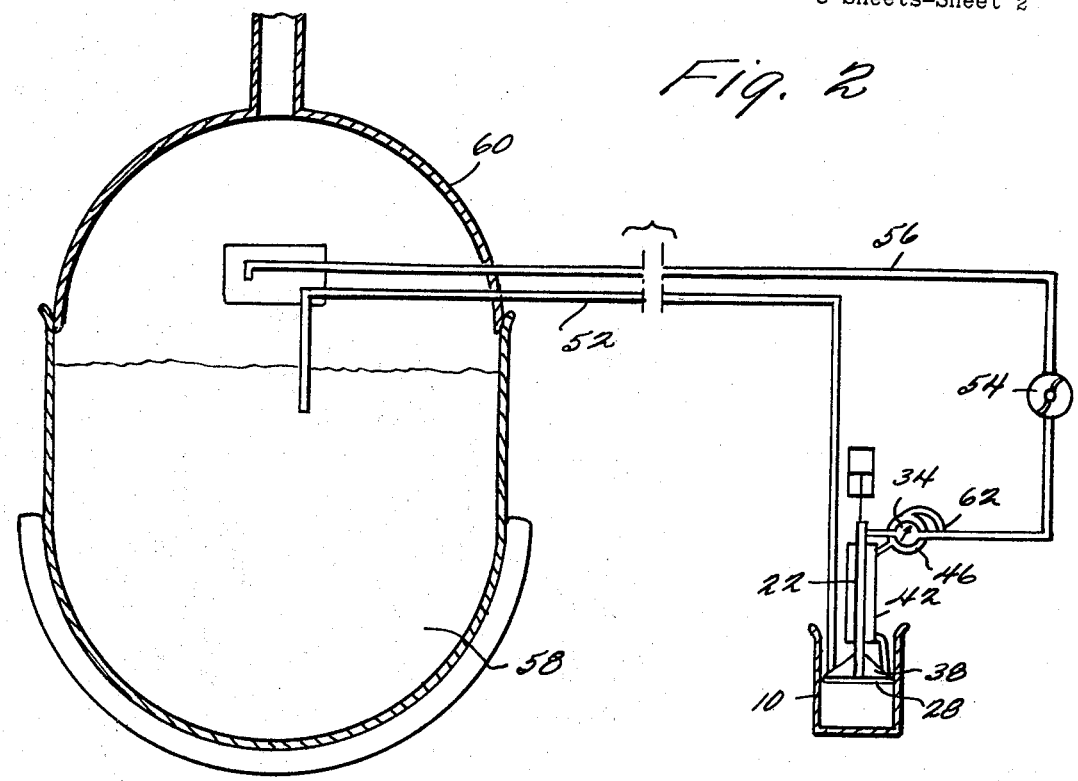
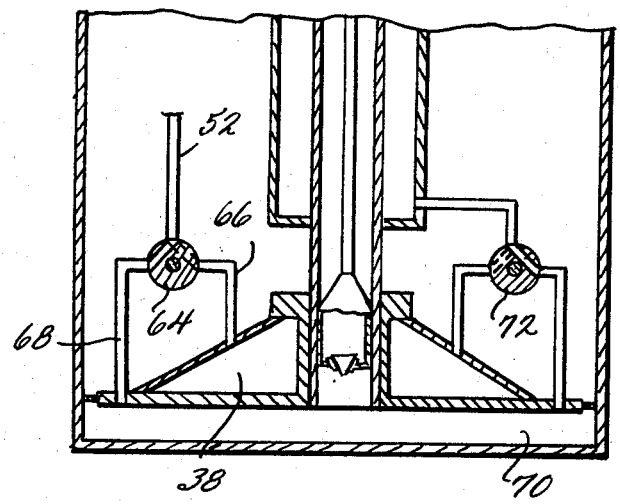

3,478,930
APPARATUS FOR DISPENSING VISCOUS MATERIALS SUCH AS HOP EXTRACT
Francis L. Rigby, Yakima, Wash., assignor to John I. Haas, Inc., Washington, D.C., a corporation of Delaware
Filed Dec. 5, 1967, Ser. No. 688,032
Int. Cl. B67d 5/62, 1/08; G01f 11/00
U.S. Cl. 222—146                                6 Claims

ABSTRACT OF THE DISCLOSURE

Viscous materials, such as hop extracts used in breweries, are dispensed from a container in a ready-to-use liquefied form. A reciprocating pump is positioned above the contents of the container. A disc-like follower plate is attached to the base of the pump cylinder. Hot brewer's wort from a brew kettle is circulated through a hollow, inverse-cone shaped retaining wall seated on the follower plate, thereby heating the plate, which conductively heats and liquefies a thin layer in the uppermost level of the extract which is situated adjacent to the heated follower plate, while the remainder of the extract retains its solid or semi-solid form. The liquefied extract is pumped upwardly through the cylinder to a volume measuring meter, both of which are continually heated by the circulating wort. The extract is then dispensed directly into an adjacent brew kettle, or it is conducted to one or more remote kettles by entraining the extract in the wort and pumping the resultant emulsification through tubing to the kettles. The remnants of the extract may be flushed from the bottom of the container by circulating the brewer's wort through an opening in the follower plate where it mixes with the extract to form an emulsification which is then dispensed in the normal manner. The dispensation of the extract can be effected by the employment of an entirely automatic system if desired.

BACKGROUND AND BRIEF DESCRIPTION OF THE INVENTION

This invention relates to a method and apparatus for dispensing viscous materials such as hop extracts which are used in a brewery. While the invention is specifically directed to the dispensation of a hop extract into a brew kettle, the method and apparatus disclosed herein could be employed whenever it is desired to liquefy a portion of a naturally viscous material in order to render it pumpable, while retaining the rest of the material in solid or semi-solid form.

Hop extracts are viscous resinous materials, which are usually semi-solid or solid at ambient temperature. They are normally received in the brewery in cans or pails. Since the hop extract is resinous in character it is relatively difficult to disperse in water or wort unless it is liquefied by heating and then suspended in the wort in emulsified form. However, the flavoring components employed in a conventional hop extract are somewhat unstable in nature and the hop extract is therefore susceptible to deterioration or damage under adverse conditions, for example when subjected to heating for extended time periods, or when undergoing constant reheating. Since only a relatively small amount of extract is used at any given time, it is often necessary to reheat the extract and/or container several times before the entire contents of the container are expended. Consequently, the several reheating steps tend to damage the unstable hop extract, as does a procedure which involves heating the material for an extended period of time.

Accordingly, there are several problems assoicated with the dispensation of the hop extract in the conventional brewing environment. Various methods of dispensing the extract from the container into the brew kettle have been used, but none of them have successfully coped with the problem outlined above.

One method of adding the extract to the brew consists of perforating the can in which the extract is contained with several small holes and then suspending the can above or in the boiling wort in the brew kettle. The heat from the boiling wort liquefies the extract, which then drips through the holes into the boiling wort.

A different method of adding the extract involves opening the cans and placing them under a stream of warm wort prior to dispensing them into the boiling brew kettle. The warm wort slowly liquefies the extract and washes it out of the can.

Another method of dispensing the extract comprises liquefying the viscous material by placing the unopened container, whether a can or a pail, in a heating medium such as a water bath, or an electrically or steam-heated device. The liquefied extract is then either poured directly into the wort in the brew kettle, or is emulsified by stirring in a separate vessel with hot water or brewer's wort and the emulsion is then added to the brew kettle. This procedure is most often used with pails having a capacity of approximately 5 gallons.

There are several reasons why the afore-mentioned methods have failed to solve the dispensation problem. Each of the methods described are quite cumbersome and time-consuming, especially where the dosage rate requires that many cans of extract be employed. The method of heating the can of extract in a water bath or the like is especially cumbersome in that a considerable amount of labor and handling of equipment is obviously involved in this process. Moreover, particularly in the first and second methods described above, any labels or the like on the cans must be removed prior to suspension above or immersion in the brew kettle, and where lithographing or enamelling of the inner or outer surfaces of the can has been used there is a substantial risk of contaminating the wort. Also, undesirable metallic elements such as tin and iron may be introduced into the brew kettle in trace amounts. Furthermore, the accurate use of only a part of the contents is difficult due to the imprecise nature of the processes involved.

Another very important disadvantage which is inherent in all of the prior methods is the fact that the entire contents of the pails or drums must be liquefied at one time. As mentioned previously, a single container such as a large 55 gallon drum may contain enough extract for several days use in a normal brewery. Thus the user is faced with the alternative of either constantly maintaining the entire can or container at an elevated temperture for in extended period of time, or continually reheating the container throughout the afore-mentioned period. Since the hop extract should be exposed to heat for the minimum possible time, the first alternative is obviously unsuitable since it will almost certainly result in damage to the extract. Reheating the container of extract prior to each occasion of use would similarly be harmful to the extract for the reasons mentioned above; in addition, there is the added disadvantage that the extract has poor heat-transfer properties and considerable time is required to liquefy a large container. This would obviously be time-consuming and inconvenient in normal brewery operations.

It is apparent therefore, that prior attempts to remedy the problems associated with dispensing a hop extract have been less than fully successful.

The present invention satisfactorily solves the afore-mentioned problems by employing a pumping system in conjunction with a unique viscous material heating arrangement in order to convey in liquefied form only that portion of the hop extract which is to be used immediately.

Of course, pumps for the transfer or dispensing of heavy viscous materials such as glue, putty, caulking compounds, liquid asphalt etc. are in wide-spread use. However, these pumps are not compatible for use with hop extracts or with other viscous materials of similar properties for the reasons previously mentioned. A succinct restatement of these reasons is as follows. At ambient temperature some extracts are essentially solid and can not be pumped unless liquefied by heat. However, heaters available for liquefying the viscous material necessarily liquefy the entire contents at one time, in the matter of the water baths or electrically or steam-heated devices mentioned previously. This is, of course, harmful to the hop extracts, or to any viscous material which tends to deteriorate after successive reheatings and/or extended heating periods.

Moreover, the extract may require transfer over a substantial distance through pipes, particularly where a single drum and pump installation is used to treat two or more remotely located brew kettles. These transfer lines must be heated in order to maintain the extract in a fluid state. Since the addition of a hop extract is a periodic operation, the transfer lines would require constant heating which would be detrimental to the extract remaining in the line. Or, in the alternative, they would require heating prior to being used which is also quite inconvenient in the standard brewery operation.

In the instant invention, an innovative pumping system has been devised which employs the hot brewer's wort from the brew kettle to liquefy only that part of the extract which will be immediately used. Secondly, the same wort which is used as a heating medium to liquefy the extract in the container is also used as an emulsifying medium in which the liquefied extract is suspended in order to ensure adequate dispersion of the extract in the wort. A third feature of the innovation is to employ the same hot wort as a conducting or conveying medium whereby the extract is carried as part of the emulsification through appropriate tubing or conduits to the brew kettle. Since the extract is entrained in the wort in the form of an emulsification, the heat from the wort continually maintains the extract in a liquefied state, thereby facilitating the transfer to the brew kettle as well as obviating the problems inherent in a possible adaptation of existing pump devices to perform these functions.

A brief descripton of the method and apparatus employed in the dispensation of the viscous material as practiced in this invention follows:

Assuming that the hop extract is confined in a standard container such as a 55 gallon can or tank, a suitably-modified conventional reciprocating pump is positioned in an operative position within the tank. The pump, which possesses a reciprocating air powered motor, a piston rod attached to a piston within a cylinder, and appropriate valves which allow extraction of the material as well as preventing back-flow during operation, also has attached to the base thereof a metal follower plate of a disc-like lower configuration which is placed on top of the upper surface of the viscous material. A retaining wall is attached to the follower plate in order to create a hollow inverted cone-shaped tank. This tank is connected by means of appropriate tubing to a source of liquid brewer's wort. The brewer's wort is circulated through the tank, thus heating the follower plate, which in turn heats by conduction a thin layer of the viscous material in the uppermost level of the hop extarct. Exposure to the heating action liquefies this layer, whereupon the reciprocating pump draws the liquefied layer up through the hollow cylinder of the pump and through a volumetric metering device, at which point it may be dispensed directly into a brew kettle if desired.

At the same time, the brewer's wort which has been circulating within the tank is conducted to a hollow metal jacket which surrounds the cylinder of the pump. Accordingly, as the viscous material is extracted from the can through the cylinder it is cotninually heated by the brewer's wort in the metal sheath or jacket which surrounds the cylinder. The metering device is also surrounded by a jacket into which the brewer's wort may be circulated. Therefore, the liquefied extract is continually heated during passage from the container to the dispensing point.

If it is necessary to transfer the extract through a considerable or substantial distance, the extract may be entrained or suspended in a brewer's wort in a common-connection pipe arrangement after the extract has been metered. When this is accomplished, the resultant emulsification will be conveyed or conducted to any remote brewing kettles in liquefied form without the necessity of constantly heating or reheating the transfer conduits or lines, which would of course be detrimental to the extract remaining in the line. Moreover, the volume-recording meter will function properly, even when measuring extremely viscous materials which would otherwise congeal and foul the meter, because of the provision for encasing the meter in a jacket through which the hot wort can be circulated.

The pump for conveying the brewer's wort may be located at various places in the line. For example, it may be placed in a position in the line prior to the extract-pumping action, or it may be placed in the line subsequent thereto; that is, between the extract-pumping action and the brewing kettles. The latter arrangement has the added advantage that the wort circulating pump acts in some degree as an in-line mixer, thereby giving increased emulsification of the extract in the hot wort.

If desired, the remnants or last traces of the hot extract which remain in the bottom of the can or tank may be flushed by providing a valving arrangement which permits the hot wort to be circulated through the follower plate in order to emulsify the top extract in the hot wort. The suspension or emulsification is then conveyed through the remainder of the standard pumping system and deposited in the brewing kettles. Also, in contra-distinction to prior methods of dispensing hop extract, it is apparent that the present method is readily adaptable to automation. Thus, by the appropriate inclusion of timing and switching devices, which are well known to those skilled in the art, the addition of the extract by the method of this invention can be made completely automatic.

It is apparent therefore, that not only does the present innovation solve the long-standing problems associated with the dispensation of a viscous material such as hop extract in brewing operations, but it does so in a manner which results in several additional advantages. For example, manual labor is greatly reduced and convenience is tremendously increased. Also, any required dosage ranging from a fraction of a pound to a few hundred pounds, can be dispensed from a single large container. Additionally, one or several brew kettles can be serviced by a single remote extract-dispensing installation by the provision of appropriate conduits or tubing. The extract does not come in contact with the operator's skin or clothing, and cleanup problems are virtually eliminated. Additionally, the container and concomitant features such as labels, lithographing, glue, tin plating and solder do not come in contact with the wort as they frequently do in the case of cans, thus precluding the possibility of contamination of the brew. The economics of the packaging operation are also enhanced in that packaging cost per pound of extract is decreased when large containers are used, and the empty containers, especially the 55 gallon drums, have significant resale value. Finally, the extract dispensing system may be fully automated if desired.

In addition to the advantages mentioned above, other advantages of this innovation will become apparent in the more detailed description which follows. In the more detailed description of the invention, reference will be made to the accompanying drawings in which:

FIGURE 1 is a front, part-sectional view of the pump with associated components;

FIGURE 2 depicts a diagrammatic front view of the system as a whole, including the brewing kettle, transfer lines, pumping-heating arrangement, and so forth;

FIGURE 3 is a detailed view of a modification of the invention which effects the removal of the remnants of the extract remaining in the base of the container.

DETAILED DESCRIPTION OF THE INVENTION

Figure 4:
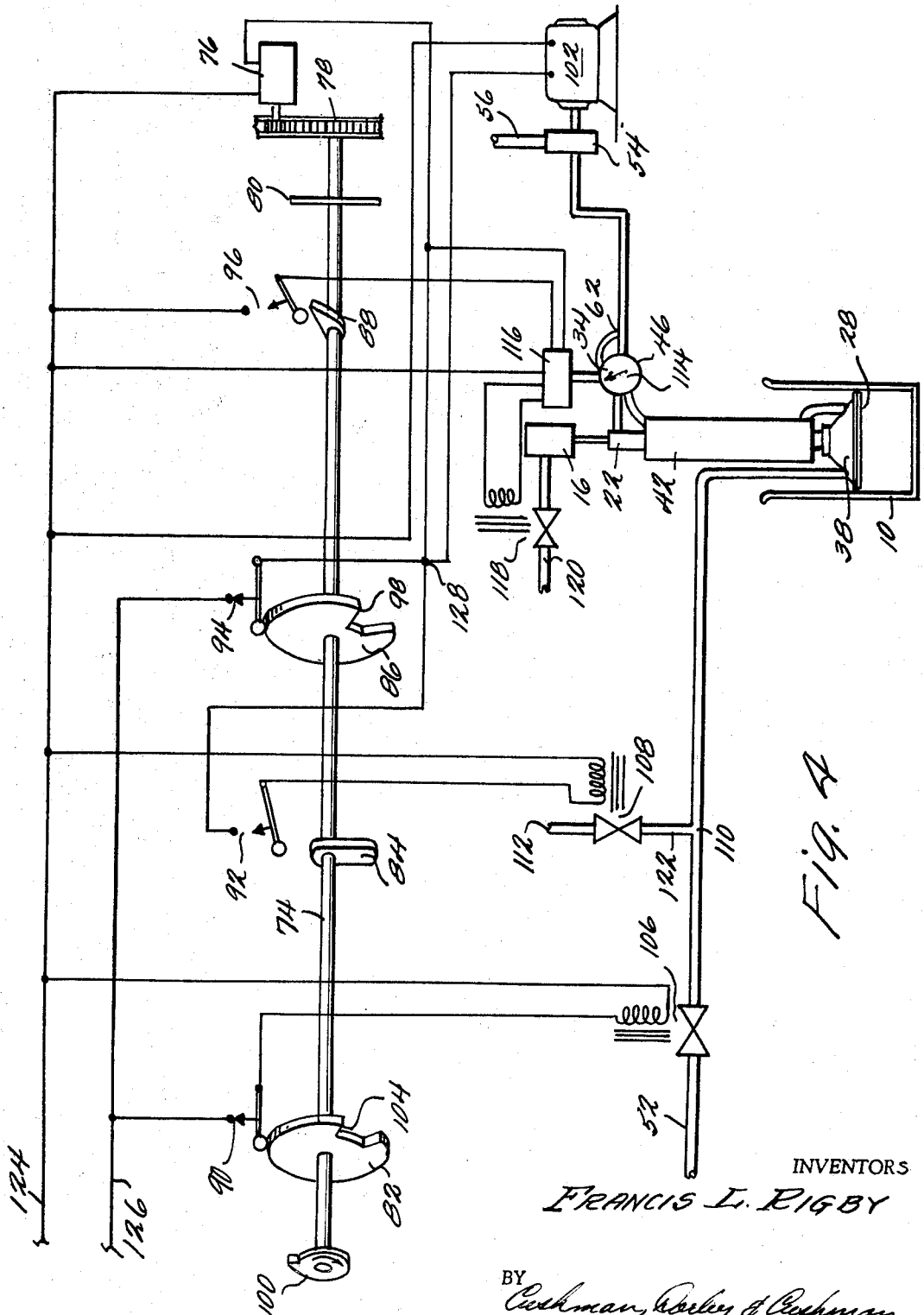
FIGURE 4 is a schematic representation of an automated system which may be employed in conjunction with the dispensing system of FIGURES 1, 2 and 3.

Referring to the drawings, FIGURE 1 depicts a container 10, which may be a tank with a capacity of fifty-five gallons, with a viscous material 12 such as a hop extract, contained therein. The pump 14 which is inserted into the container comprises a reciprocating air-powered motor 16, which operates a piston rod 18, which is in turn attached to a pump piston 20, operating or reciprocating in cylinder 22. Valve assembly 24 allows the extract to flow into the cylinder on the downstroke and valve assembly 26 prevents back-flow of the hop extract into the container 10. Attached in any suitable manner to the bottom of the cylinder 22 is a metal follower plate 28, with a sealing ring 30 attached to the outer periphery thereof. By reason of the atmospheric pressure above the plate 22, the plate maintains the surface of the viscous material in a uniformly horizontal plane as it is removed from below the plate by the pumping action of the pump. At this point, each element of the apparatus which has been described is conventional in structure and hence may be replaced by equivalent alternative arrangements if desired.

A retaining wall 36 is attached to the follower plate in order to create a hollow, inverse cone-shaped tank or heating jacket 38 above the follower plate 28. Heating tank 38 is connected by a short tube or conduit 40 to a jacket 42 which surrounds the pump cylinder 22. Jacket 42 is connected by tube 44 to spherical jacket 46, which partially surrounds volume meter 34. Jacket 46 is connected to tube 50, which joins the exit tube 48 from meter 34. The material being pumped passes through pipe 32, into volume-recording meter 34, and thence through tube 48 to the dispensing point. Heating tank 38 is in communication with brewer's wort 58 from the brewing kettle 60 by means of tube or pipe 52 and pump 54 (See FIGURE 2 of the drawings). As is apparent from FIGURE 1, the brewer's wort is conveyed through pipe 52 by means of a small pump 54 of any conventional design, but preferably self-priming.

The method of dispensing hop extract is as follows: Hot wort 58, which is at near-boiling temperature, is drawn from a brew kettle 60 through tube 52 by means of pump 54. The pump forces the hot wort 58 through tank 38 above the follower plate 28 and from there through cylinder jacket 42 and meter jacket 46. Heat is transferred from the hot wort through the metal follower plate 28, thus liquefying a thin layer of the hop extract immediately below the follower plate 28, thereby enabling it to be pumped through the valve and cylinder system of the pump. The hot wort, in the course of passage through the cylinder and meter jackets 44 and 46 respectively, maintains the hop extract in a liquid or fluid state so that all moving parts of the pump and meter system can function properly. Passage of the hot wort 58 through these jackets 44 and 46 also serves to liquefy the hop extract 12 which may have congealed in the pump system when the pump 14 has been idle for an extended period following prior use. The amount of hop extract dispensed is measured by volume meter 34, and the extract emerges through tube 48. From tube 48 the hop extract may be discharged directly into the brew kettle 60 if the pump assembly is situated close to the kettle (not shown in the drawings). If so, the discharge tube 48 must be of a relatively short length so that the hop extract can not cool and congeal in the tube 48.

However, the preferred method of conveying the hop extract as it emerges from the meter 34 through tube 48 is to connect tube 48 to the hot wort stream emerging from meter jacket 46 by means of tube 50. The hot wort with the extract entrained therein is then returned to the brew kettle 60 by means of tube 56.

It is apparent therefore, that this innovation employs a hot wort stream for at least three purposes: as a heat source to liquefy the extract; as an emulsifying medium in which the extract is suspended in order to ensure proper dispension of the extract in the wort; and as a conveying medium to transport the extract through conduits to a remote brew kettle or kettles.

The pumping rate through circulating pump 54 is normally in the range of ten to fifteen gallons per minute while the volume of hop extract discharged by the extract pump through meter 34 is normally in the range of .5 to 3 gallons per minute. Mixing of the extract and hot wort streams in tube 56 ensures a readily pumpable or flowable suspension which can be pumped through substantial distances in the brewery without incurring the risk of having the extract congealing in the pipe. Of course, it is not necessary to continually or periodically heat the pipes by the use of external heating means, thus obviating all the attendant disadvantages associated with systems which must utilize external heating.

This arrangement enjoys the added advantage that the passage of the hot wort and hop extract in pipe 56 is accompanied by some turbulence. The turbulence can be increased if desired by the insertion of baffles, or an "in-line mixer" (neither of which is shown in the drawings) with the result that a thorough or complete emulsion of the hop extract in the wort is achieved.

Referring to FIGURE 2 of the drawings, it will be noted that the wort circulating pump 54 is situated in the wort stream *after* the stream passes through jackets 38, 42, and 46 of the extract pumping system, whereas in FIGURE 1 the circulating pump 54 is situated in the hot wort stream *before* the stream enters the jackets. Either arrangement will operate satisfactorily, but the arrangement in FIGURE 2 has the additional advantage that the circulating pump 54 acts in some degree as an "in-line mixer," thus affording increased emulsification of the extract in the hot wort.

In the preferred method of operation, assuming start-up from an idle condition wherein the hop extract has congealed in the extract container 10 and extract pump parts, hot-wort circulating pump 54 is activated approximately five minutes before the extract pump 14 is started. During this five minute warm-up period the hop extract immediately below the follower plate 28 is liquefied, as is any hop extract contained in the extract pump cylinder 22 and meter 34 which may have congealed during the idle period. After this initial period, the extract pump 14 is started and extract 12 is delivered into the hot wort stream until the meter 34 indicates that the required amount of extract has been dispensed. The extract pump 14 is then de-activated, but the hot wort circulating pump 54 is allowed to run until all of the extract in the line has been flushed into the kettle 60.

The invention can be simplified somewhat by replacing the extract meter 34 and jacket 46 which surrounds it by a counting device. The counting device, which is not shown in the drawings, would be activated by the pump piston rod in order to record the number of pump strokes, since the volume of extract delivered by each stroke of the pump piston is relatively constant. The amount of extract dispensed can thus be measured by counting the number of pump strokes. Pumps are also available in which the length of the pump stroke is adjustable, and thus the amount of extract delivered per pump stroke is also adjustable. These pumps are sometimes called "measured-shot" pumps, and could of course be used in conjunction with the extract heating-hot wort circulating system of the invention.

While the complexity of the apparatus in the system is reduced somewhat by the employment of the stroke-counting method of measuring the extract, special attention is required when starting with a full container of extract, or when the container of extract is nearly empty. When the pump is installed in a full container of extract there may be pockets of air under the follower plate and in the cylinder assembly. The initial strokes of the pump remove any such air pockets; these initial strokes would of course be recorded by the stroke counter unless appropriate steps are taken to disconnect the counter for this interval, or to reset the counter when the air has been removed and the extract begins to flow. Similarly, when the container is nearly empty and the follower plate is in contact with the bottom thereof, some pumps will continue to operate even though no extract is being delivered. To avoid error in measurement these strokes should also not be counted.

Another method of measuring the amount of extract dispensed (not shown in the drawings) is to place the entire pump assembly on a weighing device, such as a platform scale, and weight the assembly before and after dispensing the extract. In this method of measurement all connections to the pumping assembly must be by means of flexible tubes in order not to interfere with the operation of the scale. Also, care must be taken to ensure that all wort lines and jackets are either full of wort or empty at both times when the weight is measured, in order to assure accurate measurement.

Referring now to FIGURE 3 of the drawings, a modification of the invention is disclosed which permits flushing of the last traces or remnant of the hop extract from the bottom of the container when the follower plate has traveled its full distance into the container. It is well known that pumping systems of this nature rarely empty the container completely, due to non-conformity of the pump follower plate with the bottom of the container, the cavity of the entrance of the pump cylinder, and the ledge created by the sealing lip which wipes the container walls in the course of travel of the follower plate down into the container.

The amount of residue left in the container is normally relatively constant, and although the amount is small (of the order of .25 pound for a 5 gallon capacity container), nevertheless this residue or remnant is significant when a high-value product such as hop extract is involved. Since hop extract is a sticky resinous material, which is difficult to remove from skin and clothing, removal of the residual extract remaining in the container by hand, such as by scraping it out, is a highly unpleasant operation. This becomes even more difficult with a large container such as a 55-gallon drum due to the depth of the container. The flushing feature of the invention, which will be described in detail below, enables one to remove this residual extract in a clean and efficient manner.

The hot wort stream coming from the brew kettle 60 through pipe 52 enters a three-way cock valve 64, which by appropriate setting will direct the flow of hot wort either through pipe 66 into the heating jacket 38 above the follower plate 28, or when the follower plate has reached the bottom of the container, the wort stream can be directed through pipe 68 into area or space 70 below the follower plate 28. Simultaneously, the three-way cock 72 is rotated to allow the stream of hot wort to return to the kettle in the normal manner; however, as shown in FIGURE 3, the flow by-passes the follower plate jacket 38. The follower plate 28 should be raised slightly to make a small air cavity underneath it.

Thus, the hot wort stream passing through space 70 below the follower plate liquefies the residual amount of extract remaining in the container and carries it to the brew kettle. The amount of residual extract remaining under the follower plate 28 in successive containers for any given pump-container arrangement can be established after a few trials and will be found to be relatively constant. Thereafter, using the afore-described flushing procedure with hot wort, this constant value can be added to the meter reading to ascertain the precise amount of extract which has been dispensed into the brew. This system makes it possible to utilize the entire contents of the extract container in a simple, clean and efficient manner, as well as eliminating any necessity for clean-up of the follower plate assembly during transfer to a fresh container of extract.

It is apparent that in contrast to prior methods of dispensing hop extract, the present invention is readily adaptable to automation. By the appropriate inclusion of timing and switching devices, which are well known to those skilled in the art, the addition of the extract by the method of this invention can be made completely automatic.

Referring to FIGURE 4 of the drawings, an automated system for dispensing hop extract is disclosed. The rotatable shaft 74, driven by a synchronous motor 76 through gear train 78 and slipclutch 80, carries four cams 82, 84, 86 and 88, which operate electrical switches 90, 92, 94 and 96 respectively. These cams are cut and rotationally fixed in position on shaft 74 so as to activate the corresponding switches in the desired sequence, thereby activating or deactivating solenoid valves which control the automatic dispensing system.

The sequence of operation of the system is as follows: shaft 74 with affixed cams is manually rotated by control knob 100 until point 98 on cam 86 causes the contact points of switch 94 to close, thereby supplying electrical current from lines 124 and 126 to the synchronous motor 76 and the hot-wort circulating pump motor 102. Simultaneously, point 104 of cam 82 causes contact points of switch 90 to close, energizing solenoid valve 106 to open, thereby allowing hot wort to be drawn through pipe 52 from the brew kettle 60 by the hot-wort circulating pump 54.

At this point, hot wort is being circulated from the brew kettle 60 through pipe 52, valve 106, pipe 110, follower-plate heating tank 38, extract-pump cylinder jacket 42 and meter jacket 46 by means of hot-wort circulating pump 54, from which it is discharged into pipe 56 and returned to the brew kettle 60. Heat which is conducted from the wort through the extract-pump follower plate 28, cylinder wall 22 and meter wall 114 liquefies the hop extract in the pumping system.

Meanwhile, shaft 74 with affixed cams is being rotated by motor drive assembly 76, 78 and 80. Cam 88 is so affixed to shaft 74 as to activate switch 96 only after the hot-wort circulating pump 54 has been operating for a period (normally five to ten minutes) which is sufficient to liquefy the residual hop extract in the pumping system, as well as a thin layer in the uppermost level of the extract in the container 10. Cam 88 then momentarily closes the contact points of switch 96, supplying a brief pulse of electrical power to meter control system 116 of meter 34. Meter 34 and control system 116 comprise a commercially available system which can be set to deliver any desired weight or volume of material and require only momentary closure of the activating circuit.

Activation of meter control 116 causes solenoid valve 118 to open, which supplies compressed air from pipe 120 to the extract pump air motor 16. When meter 34 indicates that the required amount of hop extract has been dispensed, meter control 116 deactivates solenoid valve 118, thereby stopping the flow of compressed air to the air pump motor 16. The commercially available meter in control system 116 and 34 automatically resets to zero in preparation for a subsequent sequence.

The electrical power for the meter control system is drawn from point 128 of the electrical circuitry, which is energized only if switch 94 is closed and the hot-wort circulating pump 54 is energized. Thus the extract pump 14 cannot function unless the hot-wort circulating pump 54 is operating.

As described previously, the liquefied hop extract emerging from the meter 34 may be combined with the hot-wort stream at junction point 62, and the combined streams are conveyed to a remotely-located brew kettle through pipe 56. The shape of cam 86 and the speed of rotation of shaft 74 are designed to ensure that the hot-wort circulating pump 54 will operate for a period substantially longer than is required to dispense the extract dosage. This ensures that all of the extract pumped into the wort stream at junction 62 will be carried to the brew kettle 60 by hot wort, thus precluding the possiblity of the extract congealing in the pipe prior to delivery to the brew kettles.

When the extract dispensing system is used frequently, for example two or three times per day, it is satisfactory to leave the wort lines full of wort between successive operating periods. However, if it is preferred to flush these lines with water after each period of use, this washing-out operation may be accomplished by utilizing cam 84 and switch 92. Cam 84 is affixed to shaft 74 in such a position that switch 92 will be closed at a point of time approximately two minutes before cam 86 opens switch 94 to stop the wort circulating pump 54. Closing of the switch 92 energizes solenoid valve 108, which then opens and allows water from water main 112 to enter the system. The water, being under main pressure, flows in both directions in pipe 110 from junction 122, flushing the wort from pipe 110 through pipe 52 into the brew kettle, and also from the remainder of the hot-wort pumping system in the direction of the extract pump jackets. Since the length of pipe 52 will normally be relatively short, and since it is not desirable to allow any excessive water to pass through pipe 52 into the brew kettle 60, cam 82 is cut or patterned and mounted in such a manner that switch 90 will open very soon after the energizing of solenoid valve 108, thereby closing solenoid valve 106 and permitting water to flow only in the direction of hot wort pump 54.

When water has been allowed to flow for a sufficient time to flush the wort from the entire system, cam 86 allows switch 94 to open, which simultaneously deactivates the hot-wort circulating pump motor 102 and deenergizes solenoid valve 108, thereby stopping the flow of water. The entire system as then at rest and can be sequentially reactivated by once again manually rotating knob 100.

It will become obvious to those skilled in the art of automation that the required sequence of operations can be controlled by various combinations of instrumentation components. For example, cam 82 can be eliminated by using a normally-open solenoid valve at 108 and energizing this valve from switch 92 through a time-delay relay which will energize valve 106 to close it according to the time-delay provided by the relay. The duration of the time-delay may be a fraction of a second or several minutes, as desired. Time-delay circuits can also be devised which will allow more leeway in the cutting and positioning of cams 84 and 86. For instance, a time-delay circuit can be used to insure that the wort-circulating pump 54 continues to operate for a selected time after the extract pump has stopped. A time-delay circuit may also be employed to open solenoid valve 108 at an appropriate interval after completion of the pumping of the extract.

All of the control components of the aforedescribed automated system constitute well-known and commercially available items. However, it would appear that the present system comprises the first automated method of dispensing hop extract. It is also apparent that this particular automated system can be employed in conjunction with the less desirable prior methods of liquefying the extract, such as pre-liquefying the entire container of extract and maintaining all extract lines in a constantly heated condition by appropriate means such as steam jackets of electrical heaters. As pointed out earlier however, these systems are less than fully desirable since the excessive heating of the extract which results is detrimental to the quality of the extract.

The method and apparatus for dispensing viscous materials such as hop extract, as disclosed herein, constitutes the first complete solution of the problems which have heretofore been encountered in the use of hop extract in breweries. In consonance with the invention, any desired dosage of extract can be automatically dispensed in a properly emulsified condition either adjacent to or remote from a brew kettle without damaging the extract in any way. In addition, all of the extract in the container can be economically and efficiently utilized, while eliminating cleanup problems as well as the possibility of contamination of the brew.

Although the invention has been described with reference to a particular embodiment, it will become apparent to those skilled in the art that variations can be made in the dispensing method and apparatus. All such variations as would be obvious to those skilled in this art are intended to be included within the scope of this invention.

What is claimed is:

1. Apparatus for dispensing a viscous hop extract comprising:
   a container for said viscous hop extract;
   means for heating a portion of said viscous hop extract in order to liquefy only a thin layer of said portion of said viscous hop extract, said heating means comprising a brewer's wort maintained at near boiling temperature which is circulated adjacent to said portion of said viscous hop extract;
   pumping means including a hollow cylinder having an inlet in communication with said container, and an outlet in communication with a volume meter whereby liquefied extract is conveyed through said hollow cylinder to said volume meter in order that a measured amount of said extract can be dispensed, a first heating jacket partially surrounding said hollow cylinder, said first heating jacket being in fluid communication with said brewer's wort; and
   a second heating jacket which partially surrounds said volume meter, said second jacket being in fluid communication with said first jacket, such that the liquefied thin layer of hop extract which is being conveyed through said hollow cylinder and said volume meter is conductively heated by circulating said brewer's wort through said first and second heating jackets, in order to prevent congealing of said liquefied thin layer of said viscous hop extract.

2. The apparatus of claim 1 in which said heating means includes:
   a heating tank which is positioned on the upper surface of said viscous material, said heating tank communicating with said fluid heating medium for the purpose of liquefying a thin layer of said viscous material by means of conductive heating.

3. The apparatus of claim 2 in which:
   said heating tank comprises a disc-like follower plate which is positioned on the upper surface of said viscous material, said follower plate having a cone-shaped retaining wall extending upwardly therefrom; and
   a pair of conduits, including a fluid-entrance conduit and a fluid-exit conduit, communicating with the interior of said tank by means of openings in said retaining wall, such that said fluid heat medium may be circulated through said heating tank.

4. The apparatus of claim 1 including:
   means for flushing the residue of said viscous material from said container, said flushing means comprising;
   a first conduit means in direct communication with said viscous material at one extremity, and with said fluid heating medium at the other extremity, such that said fluid heating medium may mix directly with said residue in order to liquefy said residue of said viscous material, thus forming an emulsion; and a second conduit means in direct communication with said viscous material, for the purpose of conveying said emulsion to said predetermined dispensing location.

5. The apparatus of claim 1 in which:

said liquefied thin layer of hop extract is heated subsequent to being conveyed through said volume meter by entraining said liquefied hop extract in said brewer's wort at a junction of an extract-conveying conduit and a wort-conveying pipe, thus forming a heated emulsion which prevents congealing of said extract while being conveyed to a remotely-located brewing kettle, as well as ensuring a sufficient dispersion of said extract in said wort.

6. The apparatus of claim 5 in which:

said heated emulsion is conveyed to said remotely located brewing kettle through a fluid conduit which connects said volume meter with said brewing kettle by the pumping action of a pump; said pump being connected to said fluid conduit such that said heated emulsion is agitated by said pumping action, thus achieving increased emulsification of said extract in said wort.

References Cited

UNITED STATES PATENTS

| | | | |
|---|---|---|---|
| 1,929,231 | 10/1933 | Yirava | 222—146 |
| 2,461,647 | 2/1949 | Lovett et al. | 222—146 |
| 3,031,106 | 4/1962 | Hooker | 222—146 |
| 3,043,480 | 7/1962 | Wittrock | 222—146 |
| 3,282,469 | 11/1966 | Skonberg | 222—146 |
| 3,330,332 | 7/1967 | Worner | 165—66 |
| 3,348,734 | 10/1967 | Rice et al. | 222—148 |

FOREIGN PATENTS 823,236  1/1938  France.

ROBERT B. REEVES, Primary Examiner

H. S. LANE, Assistant Examiner

U.S. Cl. X.R.

73—277; 165—66; 222—148, 261